(12) United States Patent
Tumbleston et al.

(10) Patent No.: US 11,801,643 B2
(45) Date of Patent: Oct. 31, 2023

(54) PERFORMANCE OPTIMIZATION IN ADDITIVE MANUFACTURING (71) Applicant: Carbon, Inc., Redwood City, CA (US)

(72) Inventors: John R. Tumbleston, Menlo Park, CA (US); Clarissa Gutierrez, San Carlos, CA (US); Ronald Truong, San Mateo, CA (US); Kyle Laaker, Redwood City, CA (US); Craig B. Carlson, Los Altos, CA (US); Roy Goldman, Cupertino, CA (US); Abhishek Parmar, Palo Alto, CA (US)

(73) Assignee: Carbon, Inc., Redwood City, CA (US)

( * ) Notice: Subject to any disclaimer, the term of this patent is extended or adjusted under 35 U.S.C. 154(b) by 498 days.

(21) Appl. No.: 16/650,521

(22) PCT Filed: Oct. 5, 2018

(86) PCT No.: PCT/US2018/054612
§ 371 (c)(1),
(2) Date: Mar. 25, 2020

(87) PCT Pub. No.: WO2019/074790
PCT Pub. Date: Apr. 18, 2019

(65) Prior Publication Data
US 2020/0276765 A1    Sep. 3, 2020

Related U.S. Application Data (60) Provisional application No. 62/569,687, filed on Oct. 9, 2017.

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/307* (2017.08); *B29C 64/314* (2017.08);
(Continued)

(58) Field of Classification Search
None
See application file for complete search history.

(56) References Cited

U.S. PATENT DOCUMENTS

2006/0149407 A1    7/2006   Markham et al.
2009/0165126 A1*   6/2009   Jung ................. G06Q 50/04
                                                    726/21
(Continued)

FOREIGN PATENT DOCUMENTS

EP    1769904    4/2007

OTHER PUBLICATIONS

International Search Report and Written Opinion for PCT/US2018/054612 dated Jan. 17, 2018, 14 pages.

*Primary Examiner* — Qing Yuan Wu
(74) *Attorney, Agent, or Firm* — Myers Bigel, P.A.

(57) ABSTRACT

A method of enhancing a performance characteristic of an additive manufacturing apparatus, the method including: (a) dispensing a batch of a light polymerizable resin into the additive manufacturing apparatus, the batch characterized by at least one physical characteristic; (b) determining the unique identity of the batch; (c) sending the unique identity of the batch to a database; then (d) either: (i) receiving on the controller from the database modified operating instructions for the resin batch, which modified operating instructions have been modified based on the at least one physical characteristic, or (ii) receiving on the controller from the database the at least one physical characteristic for the specific resin batch and modifying the operating instructions based on the at least one physical characteristic; and then (e)
(Continued)

producing the object from the batch of light polymerizable resin on the additive manufacturing apparatus with the modified operating instructions.

18 Claims, 6 Drawing Sheets

(51) Int. Cl.

| | |
|---|---|
| *B29C 64/314* | (2017.01) |
| *B33Y 40/10* | (2020.01) |
| *B33Y 50/00* | (2015.01) |
| *B29C 64/307* | (2017.01) |
| *B29C 64/386* | (2017.01) |
| *G05B 19/4099* | (2006.01) |
| *G06Q 10/0631* | (2023.01) |
| *G06Q 30/018* | (2023.01) |
| *G06Q 50/04* | (2012.01) |
| *G06Q 50/28* | (2012.01) |

(52) U.S. Cl.
CPC ............ *B29C 64/386* (2017.08); *B33Y 50/00* (2014.12); *B33Y 50/02* (2014.12); *G05B 19/4099* (2013.01); *G06Q 10/06316* (2013.01); *G06Q 30/0185* (2013.01); *G06Q 50/04* (2013.01); *G06Q 50/28* (2013.01); *B33Y 40/10* (2020.01); *G05B 2219/49013* (2013.01)

(56) References Cited

U.S. PATENT DOCUMENTS

2016/0199911 A1    7/2016  Dave et al.
2017/0087765 A1*   3/2017  Rundlett ................ B33Y 70/00
2018/0200960 A1*   7/2018  DeFelice ............... B29C 64/153

* cited by examiner

FIGURE 6C

PERFORMANCE OPTIMIZATION IN ADDITIVE MANUFACTURING

RELATED APPLICATIONS

This applications is a 35 U.S.C. § 371 national phase entry of International Application No. PCT/US2018/054612, filed Oct. 5, 2018, which claims priority to U.S. Provisional Application Ser. No. 62/569,687, filed Oct. 9, 2017, the disclosures of which are incorporated by reference herein in their entireties

FIELD OF THE INVENTION

The present invention concerns additive manufacturing with light-polymerizable resins, and methods and apparatus for enhancing performance characteristics such as accuracy during additive manufacturing.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin ontthe bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

SUMMARY OF THE INVENTION

Enhanced speed of object production can, however, result in decreased accuracy of object production. This can be offset by tuning the operating parameters (sometimes referred to as the "print program") of an apparatus to particular resin types. However, batch-to-batch variations in resin characteristics (such as viscosity and photosensitivity) for the same type of resin can then have a substantial detrimental effect on the performance of the tuned additive manufacturing process. It is difficult for resin and apparatus providers to optimize files and process steps for their end users when the object data files from which objects are produced are often the proprietary property of the end user. And the potential to utilize a greater variety of resin types, to produce objects with a greater variety of real-world properties (ranging from rigid through flexible to elastic), further complicates optimization of manufacturing performance on each apparatus. Accordingly, there is a need for new approaches to enhancing the performance of additive manufacturing apparatus.

A first aspect of the invention is a provider-based method of enhancing at least one performance characteristic of a plurality of additive manufacturing apparatuses during production of an object on each apparatus, each apparatus including a light source and a controller containing operating instructions for production of the object on that apparatus, the method comprising:

(a) blending and/or receiving a plurality of different and distinct light polymerizable resin batches;
(b) assigning a unique identity to each resin batch;
(c) determining at least one resin physical characteristic for each resin batch;
(d) optionally modifying, for each resin batch, the operating instructions for the controller of each apparatus based on the at least one physical characteristic of each resin batch to thereby provide modified operating instructions for each resin batch;
(e) storing in a database, in association with each the assigned unique identity, either (i) the at least one resin physical characteristic for each resin batch, or (ii) the modified operating instructions for each resin batch;
(f) receiving at the database an identification of a specific resin batch from which an object is to be produced on a specific additive manufacturing apparatus; and then
(g) either: (i) sending from the database to the controller of the specific additive manufacturing apparatus the modified operating instructions for the specific resin batch, for production of an object on the apparatus with the resin batch, or (ii) sending from the database to the controller of the specific additive manufacturing apparatus the at least one physical characteristic for a specific resin batch, for modification of the operating instructions based on the at least one physical characteristic, and then for production of an object on the apparatus with the resin batch.

In some embodiments, the method further comprises: packaging each resin batch in at least one container, each container having a container unique identifier (e.g., a bar code, QR code, RFID tag, NFC tag, etc.) associated therewith; associating the resin batch unique identity with the container unique identifier; and wherein the sending step (g) is carried out upon detection of the unique identifier by a unique identifier reader operatively associated with the specific apparatus and transmission of the unique identity to the database.

In some embodiments of the foregoing, the method further comprises: packaging each resin batch in at least one container; labelling each container with the resin batch unique identity; and wherein the sending step (g) is carried out upon manual entry by a user of the unique identity and transmission thereof to the database.

A second aspect of the invention is a user-based method of enhancing at least one performance characteristic of an additive manufacturing apparatus during production of an object, the apparatus including a light source and a controller containing operating instructions for production of the object on that apparatus, the method comprising:

(a) dispensing a batch of a light polymerizable resin into the additive manufacturing apparatus, the batch characterized by at least one physical characteristic;
(b) determining the unique identity of the batch;
(c) sending the unique identity of the batch to a database; then
(d) either: (i) receiving on the controller from the database modified operating instructions for the resin batch, which modified operating instructions have been modified based on the at least one physical characteristic, or (ii) receiving on the controller from the database the at least one physical characteristic for the specific resin batch and modifying the operating instructions based on the at least one physical characteristic; and then (e) producing the object from the batch of light polymerizable resin on the additive manufacturing apparatus with the modified operating instructions.

In some embodiments, the method further comprises, prior to the producing step (e), the step of: selecting a performance characteristic to be optimized (e.g., more accurate production at less speed; more rapid production at less accuracy).

Sending and receiving as described above may be carried out by any suitable means, such as over the internet.

The database described above may take any suitable form, such as a cloud database.

A further aspect of the invention is a provider-based method of enhancing at least one performance characteristic of a plurality of additive manufacturing apparatuses during production of an object on each apparatus, each apparatus including a light source and a controller containing operating instructions for production of the object on that apparatus, the method comprising:

(a) blending and/or receiving a plurality of different and distinct light polymerizable resin batches;
(b) determining at least one resin physical characteristic for each resin batch;
(c) optionally modifying, for each resin batch, the operating instructions for the controller of each apparatus based on the at least one physical characteristic of each resin batch to thereby provide modified operating instructions for each resin batch;
(d) packaging each resin batch in at least one container;
(e) storing in association with each the container either (i) the at least one resin physical characteristic for each resin batch contained therein, or (ii) the modified operating instructions for each resin batch contained therein In some embodiments of the foregoing, each container has an information storage media (e.g., a bar code, QR code, RFID tag, NFC tag, etc.) associated therewith; wherein the storing step is carried out by recording the at least one physical characteristic or modified operating instruction on the storage media.

In some embodiments of the foregoing, the method further comprises labelling each container with the at least one physical characteristic of the resin batch contained therein.

A further aspect of the invention is a user-based method of enhancing at least one performance characteristic of an additive manufacturing apparatus during production of an object, the apparatus including a light source and a controller containing operating instructions for production of the object on that apparatus, the method comprising:

(a) dispensing a batch of a light polymerizable resin from a container into the additive manufacturing apparatus, the batch characterized by at least one physical characteristic, with the container having associated therewith either the at least one physical characteristics, or modified operating instructions modified based on the at least one physical characteristic;
(b) either: (i) receiving on the controller modified operating instructions associated with the container for the resin batch therein, which modified operating instructions have been modified based on the at least one physical characteristic, or (ii) receiving on the controller the at least one physical characteristic associated with the container for the specific resin batch therein, and modifying the operating instructions based on the at least one physical characteristic; and then (c) producing the object from the batch of light polymerizable resin on the additive manufacturing apparatus with the modified operating instructions.

In some embodiments of the foregoing, the method further comprises, prior to the producing step (c), the step of: selecting a performance characteristic to be optimized (e.g., more accurate production at less speed; more rapid production at less accuracy).

In some embodiments of all the foregoing, the object is produced from an object data file entered in to the controller by the user in a secured configuration (that is, to which object data file the provider does not have access, absent specific authorization from the user).

In some embodiments of all the foregoing, the additive manufacturing apparatus comprises a bottom-up stereolithography apparatus (e.g., a continuous liquid interface production apparatus).

In some embodiments of all the foregoing, the performance characteristic comprises speed of production, accuracy of production, reliability of production (e.g., failure rate), product mechanical properties, or a combination thereof.

In some embodiments of all the foregoing, the object comprises: a patient-specific form, guide, aligner, model, or implant (e.g., a dental aligner, a dental model, a dental die, a surgical guide, a stent, etc.); or a a connector.

In some embodiments of all the foregoing, the resin physical characteristic comprises viscosity.

In some embodiments of all the foregoing, the resin physical characteristic comprises photosensitivity.

In some embodiments of all the foregoing, the resin physical characteristic comprises cure-through, overcure, or a combination thereof.

In some embodiments of all the foregoing, the resin physical characteristic comprises heat generation during photopolymerization.

In some embodiments of all the foregoing, the resin physical characteristic comprises at least one mechanical property of a test part produced by the resin (e.g., tensile properties, impact strength, shrinkage during production, shrinkage during post-production baking, etc.).

In some embodiments of all the foregoing, the modified operating instructions comprise at least one modified process parameter selected from: light intensity; light exposure duration; inter-exposure duration; speed of production; horizontal (X, Y) magnification; vertical (Z) magnification (e.g., step height); height and/or duration of upstroke in a stepped or reciprocal operating mode; height and/or duration of downstroke in a reciprocal operating mode; speed or frequency of rotation; resin heating; resin cooling; and combinations thereof.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

"Cure-through" occurs during production when a local region of the part that is intended to remain uncured, is nonetheless unintentionally cured by light passing through subsequently produced, regions of the part that underlie the region where cure through occurs. Cure through can be offset by delaying exposure of those underlying regions (e.g., by one or exposure slices).

"Over-cure" occurs during production when resin immediately adjacent the perimeter of the object being polymerized is unintentionally polymerized as well. Over-cure can be offset by shifting the perimeter of exposure inward during each exposure slice.

"Under-cure" occurs during production when resin along the perimeter of the object being polymerized is unintentionally un-polymerized. Under-cure is the opposite of over-cure. Under-cure may be offset by shifting the perimeter of exposure outward during each exposure slice. Under-cure may occur, for example, if the light dosage is low enough that there is a "dead-zone" on the side of the part causing it to be undersized.

"Unique identifier" and "unique identifier reader" as used herein refer to components of an automatic identification and data capture system. Suitable unique identifiers include, but are not limited to, bar codes (including one-dimensional and two-dimensional bar codes (QR codes)), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Such unique identifiers can be mounted on a container for resins for distribution from a resin provider to an end user, as discussed further below.

"Information storage media" as used herein may be any of the same devices described above in connection with "unique identifier", except used to store resin characteristics or modified operating instructions, as opposed to a resin unique identity, as discussed below.

1. Resin Physical Characteristics.

The present invention can be carried out with any of a variety of light polymerizable resins suitable for additive manufacturing. Examples include, but are not limited to, those described in U.S. Pat. Nos. 9,211,678; 9,205,601; and 9,216,546 to DeSimone et al.

In some embodiments, the resin can be a "dual cure" resin, including but not limited to those described in U.S. Pat. Nos. 9,676,963, 9,453,142 and 9,598,606) to Rolland et al.

The resin may be a "complete" or "one pot" resin, or a precursor resin (that is, one or more of a pair of resins to be mixed together at the point of use, such as described in PCT Patent Application Publication No. WO 2017/112653 to Rolland and Cushen), or a mixed set of precursor resins.

Particular examples of suitable resin types include, but are not limited to, Carbon, Inc. rigid polyurethane resin (RPU), flexible polyurethane resin (FPU), elastomeric polyurethane resin (EPU), cyanate ester resin (CE), epoxy resin (EPX) and urethane methacrylate resin (UMA), all available from Carbon, Inc., 1089 Mills Way, Redwood City, Calif. 94063 USA.

"Different and distinct batches of a light polymerizable resin" or "resin batches" as used herein refers to resins that are blended or mixed together, from the same or different ingredients, at different times or locations, but in accordance with the same recipe or formula, in the same amounts (give or take standard tolerances or margins of error). Such batches are typically packaged separately (though portions of the same batch may be packaged separately as well, such as when initial blending is in a large vessel, which is subsequently dispensed into separate containers for distribution to end users). Hence, while such different and distinct batches are treated and labelled as being of the same resin type (that is, of the same "resin type"), they can have subtle differences which can adversely affect their performance in use during additive manufacturing, as discussed further below.

Resin Batch Characteristics:

General. Resin batch characteristics can be determined from a sample of a newly blended or received batch of resin by any suitable technique, including direct and indirect measurements. The techniques are preferably standardized so that detected variations in resin characteristics are due to the resin itself and not due to variations in the measuring equipment or procedures.

Photosensitivity.

Resin photosensitivity may be determined on a resin batch sample by any suitable technique, including but not limited to (a) determining penetration depth, $D_p$, and critical exposure, $E_c$, to define a working curve for that resin by the working curve equation (see, e.g., Rapid Prototyping and Manufacturing: Fundamentals of Stereolithography, pp.

87-91 (P. Jacobs, Ed. 1992) and Stereolithography and Other RP&M Technologies: from Rapid Prototyping to Rapid Manufacturing, pp. 54-56 (P. Jacobs, Ed. 1996)), (b) determining resin dose-to-cure (resin curing dosage, or $D_c$) and resin light absorption (resin absorption coefficient, or alpha) for that resin, as described in J. Tumbleston et al., *Continuous liquid interface production of 3D objects*, Science xpress (16 Mar. 2015), and variations of the foregoing.]

Viscosity.

Viscosity of a resin batch sample can be determined by any suitable technique, a variety of which are known in the art. For example, viscosity can be measured on a Brookfield Model DV1 viscometer, with a Brookfield SC4-32 Small sample adapter and spindle, and a Brookfield TC-550 circulating bath with digital controller, at a bath temperature of 25 degrees centigrade.

Cure-Through and Overcure.

The cure-through and overcure during additive production can be determined on a resin batch sample by any suitable technique, typically by producing a test object (preferably under standardized production conditions) and measuring segments of the test part that are susceptible to cure-through or overcure. For example, a test part including a plurality of horizontal and vertical struts can be produced to determine cure thru and over cure values by measuring the dimensions of the horizontal and vertical struts. One or more of these parts (e.g., nine) can be produced and measured on a Keyence IM-6225T light table (available from Keyence Corp of America, Itasca, Ill., USA) using a set measurement program. Data analysis can be done using JMP statistical software (available from SAS Institute, Cary, N.C., USA), to determine the average cure thru and over cure values from all the measurements.

Heat Generation During Photopolymerization.

Heat generation during photopolymerization can be measured directly by producing a test object from a resin batch sample (under standard conditions) and measuring the temperature of the resin, or the most recently polymerized portion of the part. In the alternative, heat generation can be be calculated by modeling the production of an object in software, from known characteristics such as photosensitivity and viscosity as described above.

Mechanical Properties.

Mechanical property of a test part produced by said resin may include, e.g., tensile properties, impact strength, shrinkage during production, shrinkage during post-production baking, etc. Mechanical properties may be measured by any suitable standard technique, conforming to a known or recognized standard, or to a customized or use-specific standard. For example, shrinkage may be determined in a manner similar to that described herein.

Characteristics of Dual Precursor Resins.

In some cases, resins are provided as "dual precursor" resins, that are mixed by the end user, such as described in J. Rolland and J. Cushen, *Dual precursor resin systems for additive manufacturing with dual cure resins*, PCT Patent Application Pub. No. WO 2017/112653 (published 29 Jun. 2017). In this case, the resin characteristics may be determined for the blended resin, particularly where the two precursors are packaged in a manner that fixes one to the other (e.g., a dual chamber cartridge dispenser). Where the precursors are packaged separately, then each can carry its own unique identifier, the resin characteristics may be determined for all available combinations of different precursor batches, and the resin characteristics or operating instructions may be distributed based on the particular combination being mixed together by the end user Expected or Standard Characteristics.

Characteristics as described above can be compared to previously determined standard characteristics for a particular resin type, with the expectation that the characteristics of each batch will be reasonably close to the previously determined standard characteristics (or "expected" characteristic). Standard characteristics can be determined by any suitable technique, such as by preparing an initial "gold standard" batch of a resin blend, by selecting average or median values from a group of resin blends, etc. Standard characteristics can remain fixed, or periodically updated. As discussed below, the various operating parameters of an additive manufacturing apparatus can be set (remotely or locally) as best suited to the standard characteristics of a particular resin type, then updated (as discussed further below) to improve operating performance based on the specific characteristics of each resin batch of that resin type (as also discussed further below).

2. Additive Manufacturing Methods and Apparatus.

Additive manufacturing apparatus and methods are known. Suitable apparatus includes bottom-up and top-down additive manufacturing apparatus, generally known as stereolithography. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The inhibitor may pass entirely through the semipermeable member, or a "pool" of inhibitor may reside within the semipermeable member and pass through the resin contact surface thereof, as described in DeSimone et al. (referenced above), and also in Sun et al., US Patent Application Publication No. US 2016/0288376. While a preferred inhibitor is oxygen, other inhibitors, such as bases (including amines) as described in DeSimone et al., or those described in Sun et al., may also be used. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016)

The apparatus can include a local controller that contains and executes operating instructions for the production of a three dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., Three-dimensional printing with reciprocal feeding of polymerizable liquid PCT Patent Application Pub. No. WO 2015/195924 (published 23 Dec. 2015); Sutter et al., Fabrication of three dimensional objects with multiple operating modes, PCT Patent Application Publication No. WO 2016/140886 (published 9 Sep. 2016); J. DeSimone et al., Methods and apparatus for continuous liquid interface production with rotation, PCT Patent Application WO 2016/007495 (published 14 Jan. 2016); see also J. DeSimone et al., U.S. Pat. No. 9,211,678, and J. Batchelder et al., Continuous liquid interface production system with viscosity pump, US Patent Application Publication No. US 2017/0129169 (published 11 May 2017).

In one non-limiting embodiment, the object may be produced on a Carbon Inc., M1 or M2 additive manufacturing apparatus, available from Carbon, Inc., 1089 Mills Way, Redwood City, Calif. 94063 USA.

Washing.

Apparatus for washing parts produced by additive manufacturing are known, and can be modified for use in the present invention in accordance with known techniques. (see, e.g., U.S. Pat. Nos. 5,248,456; 5,482,659, 6,660,208; 6,996,245; and 8,529,703). However, many such part washers are not adapted to cleaning larger numbers of more diverse parts having much more diverse material properties. Hence, overall wash speed is preferably accelerated by employing higher volume liquid exchange pumps, and/or pneumatic liquid exchange, rapid draining of fluids such as by gravity-assist, more aggressive agitation, such as by spinning the objects to be cleaned in the wash liquid (e.g., while still mounted on the carrier plate on which they were produced), by including "dry" steps, such as by draining the wash liquid and spinning the object in air to centrifugally remove residual resin and wash liquid from the object, optionally by re-immersing the object in the wash liquid and repeating the wash program, etc. Additional agitation sources, such as ultrasonic agitation, can also be provided. Washing apparatus can include a local controller which can receive resin batch characteristics or modified operating instructions for carrying out a wash process, as discussed further below.

Further Curing (Baking).

Further curing of the parts can be carried out by any suitable technique, but is typically carried out by heating. Such heating may be active heating (e.g., in an oven, such as an electric, gas, solar oven or microwave oven, or combination thereof). Ovens may be batch or continuous (conveyor) ovens, as is known in the art.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating (baking) step or program is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate object may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075). As with additive manufacturing apparatus and washing apparatus, the oven or other curing apparatus can include a local controller which can receive resin batch characteristics or modified operating instructions for carrying out a bake process, as discussed further below.

4. Methods and Apparatus for Performance Optimization.

Non-limiting example embodiments of the invention are given in FIGS. 1-4, where steps that are carried out by the resin provider (or providers, as the blending of a resin batch and the characterization of a sample of that resin batch may be carried out by different entities, and/or at different locations) are shown in the upper dashed box. Steps that are carried out by the end user of the resin (recipient of the resin from the provider(s)), the entity that is producing an object by additive manufacturing, are shown in the lower dashed box. In addition, and as noted above, thick crosshatched arrows indicate steps in which materials or objects (resin, resin samples, objects prior to bake, etc.) are transferred (see, e.g., arrow 404, FIG. 4). Double lined unfilled arrows indicate steps in which data or information (resin identity, resin characteristics, process parameters) are transferred. Single line arrows indicate the repeat of process steps, such as for the characterization of a new resin batch, or the production of a new object from the same resin batch).

Figure 1:
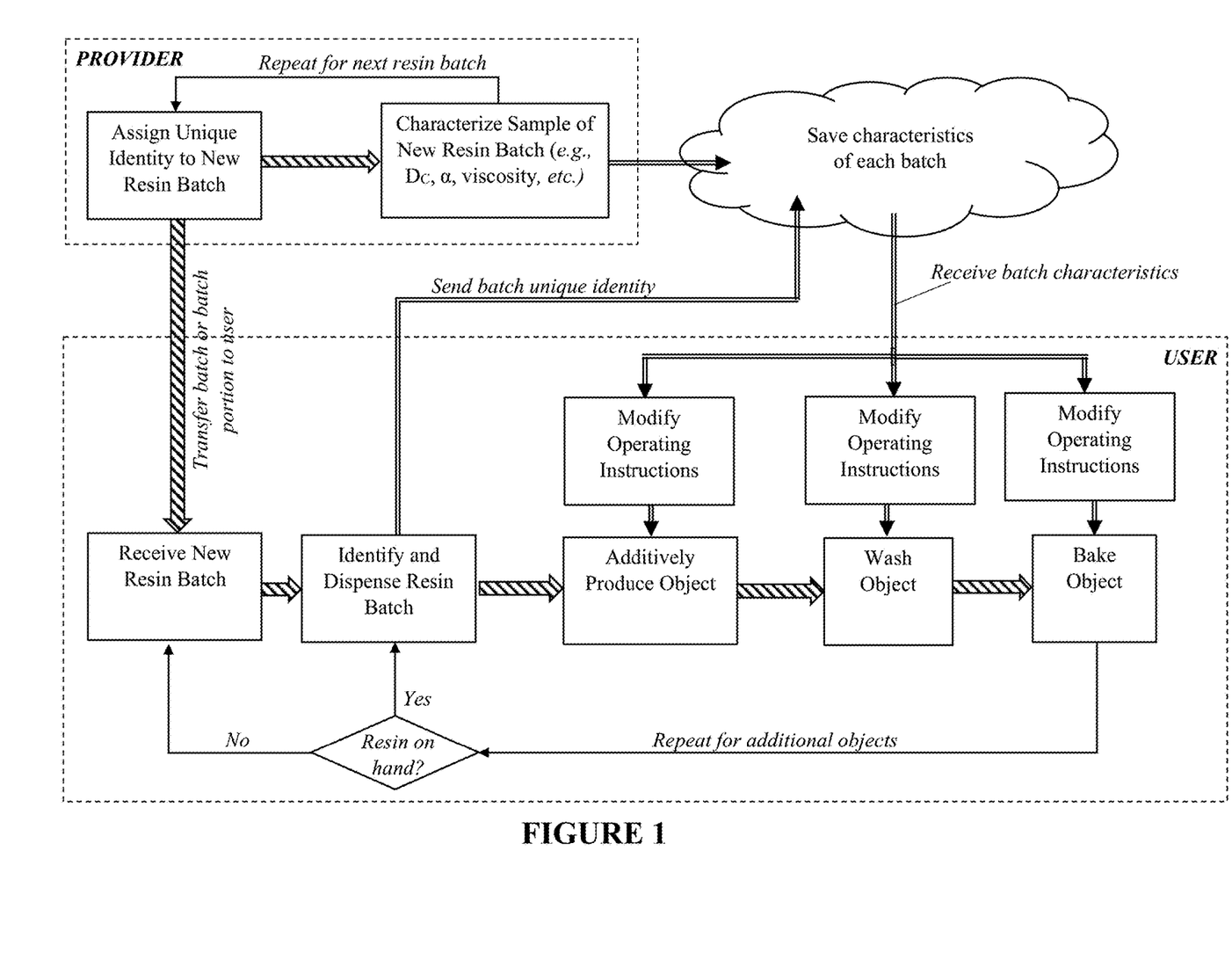
FIG. 1 schematically illustrates a first embodiment of the invention, in which resin batch characteristics are sent to the additive manufacturing apparatus over the internet. Thick crosshatched arrows indicate steps in which materials or objects (resin, resin samples, objects prior to bake, etc.) are transferred. Double lined unfilled arrows indicate steps in which data or information (resin identity, resin characteristics, process parameters) are transferred. Single line arrows indicate the repeat of process steps, such as for the characterization of a new resin batch, or the production of a new object from the same resin batch).
Figure 2:
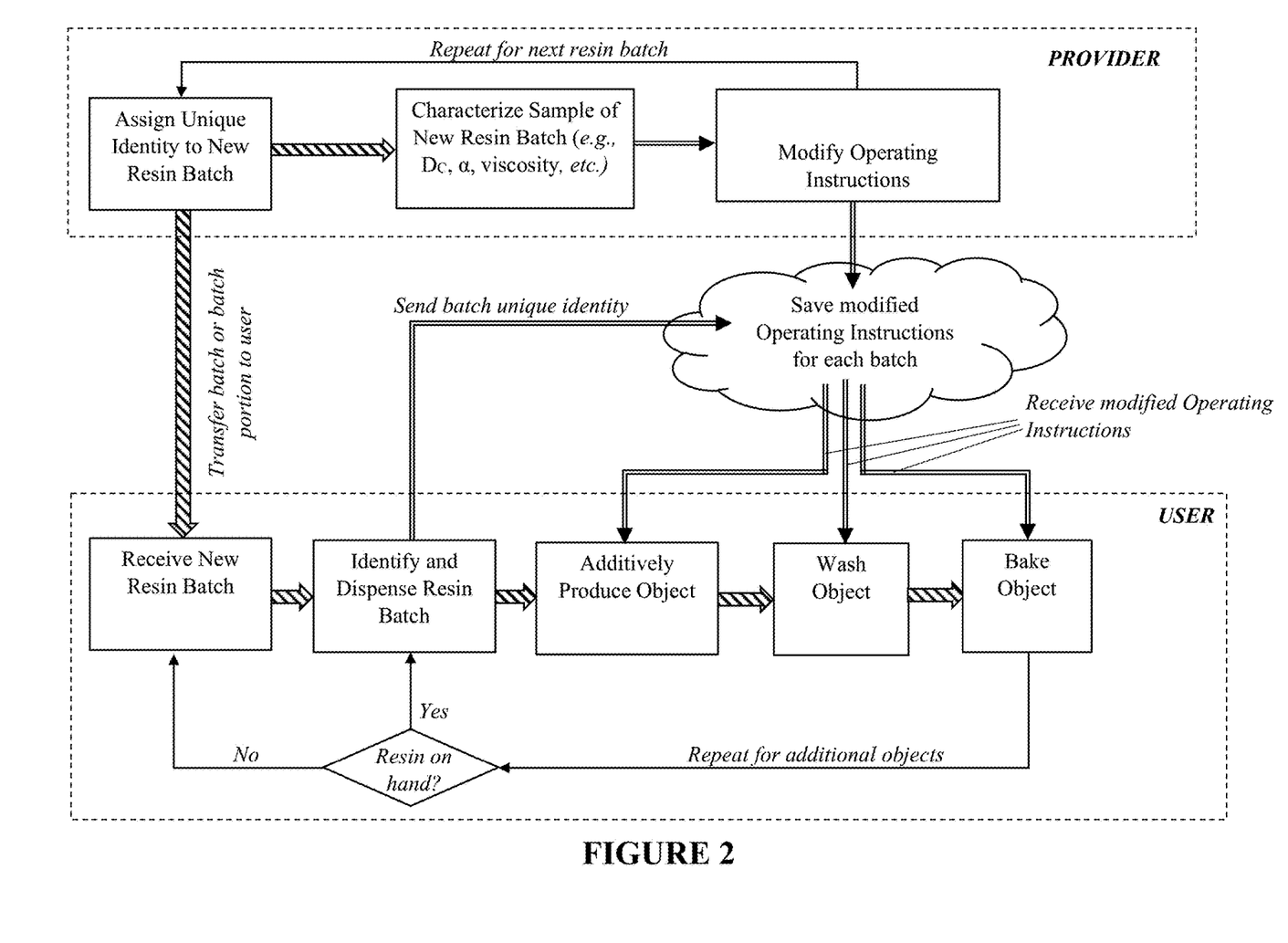
FIG. 2 schematically illustrates a second embodiment of the invention, in which additive manufacturing apparatus operating parameters for a particular resin batch are sent to the apparatus over the internet.
Figure 3:
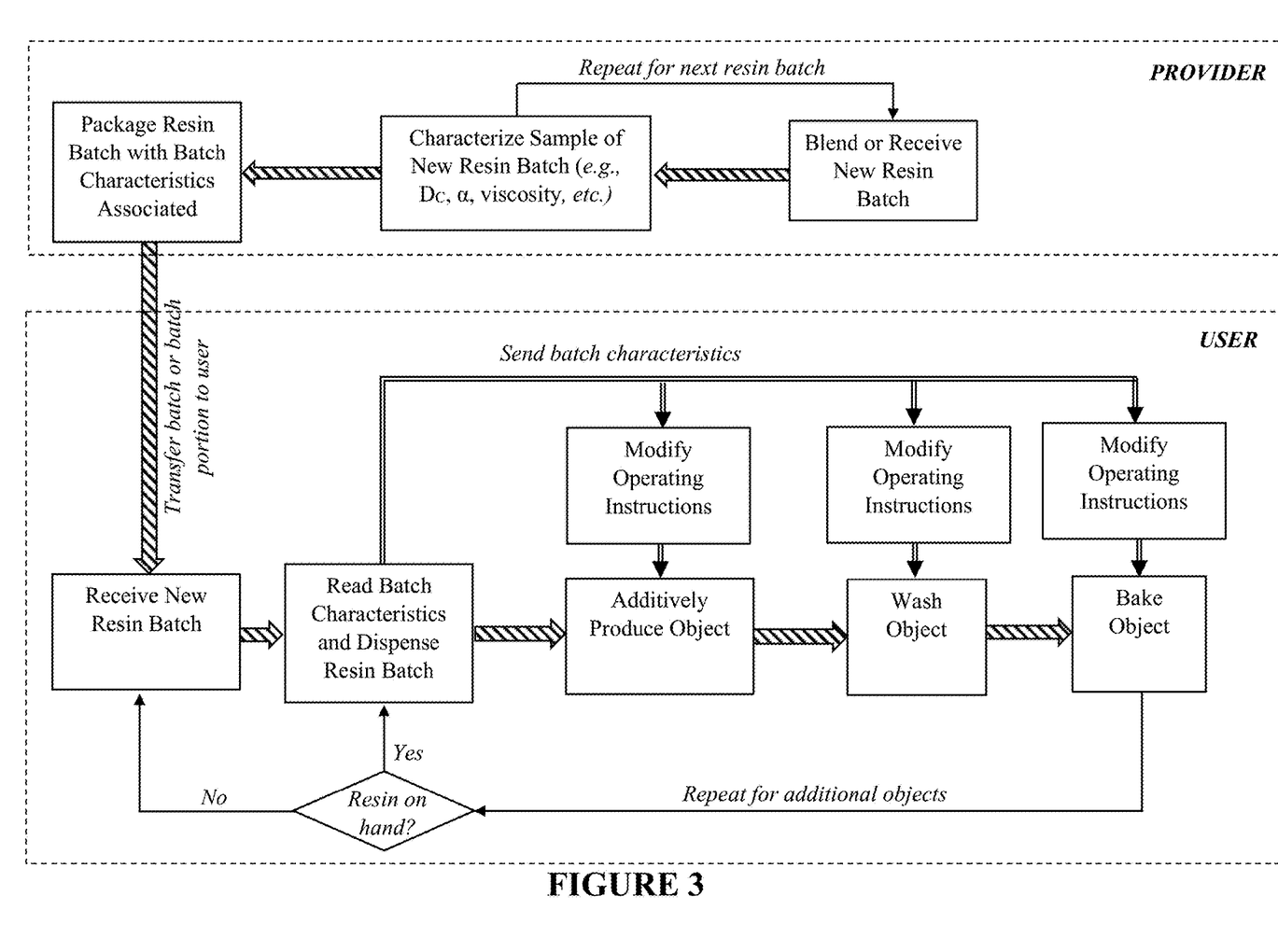
FIG. 3 schematically illustrates a third embodiment of the invention, in which resin batch characteristics are sent to the additive manufacturing apparatus by affixing or otherwise associating those characteristics to the container in which the resin is shipped to the user.
Figure 4:
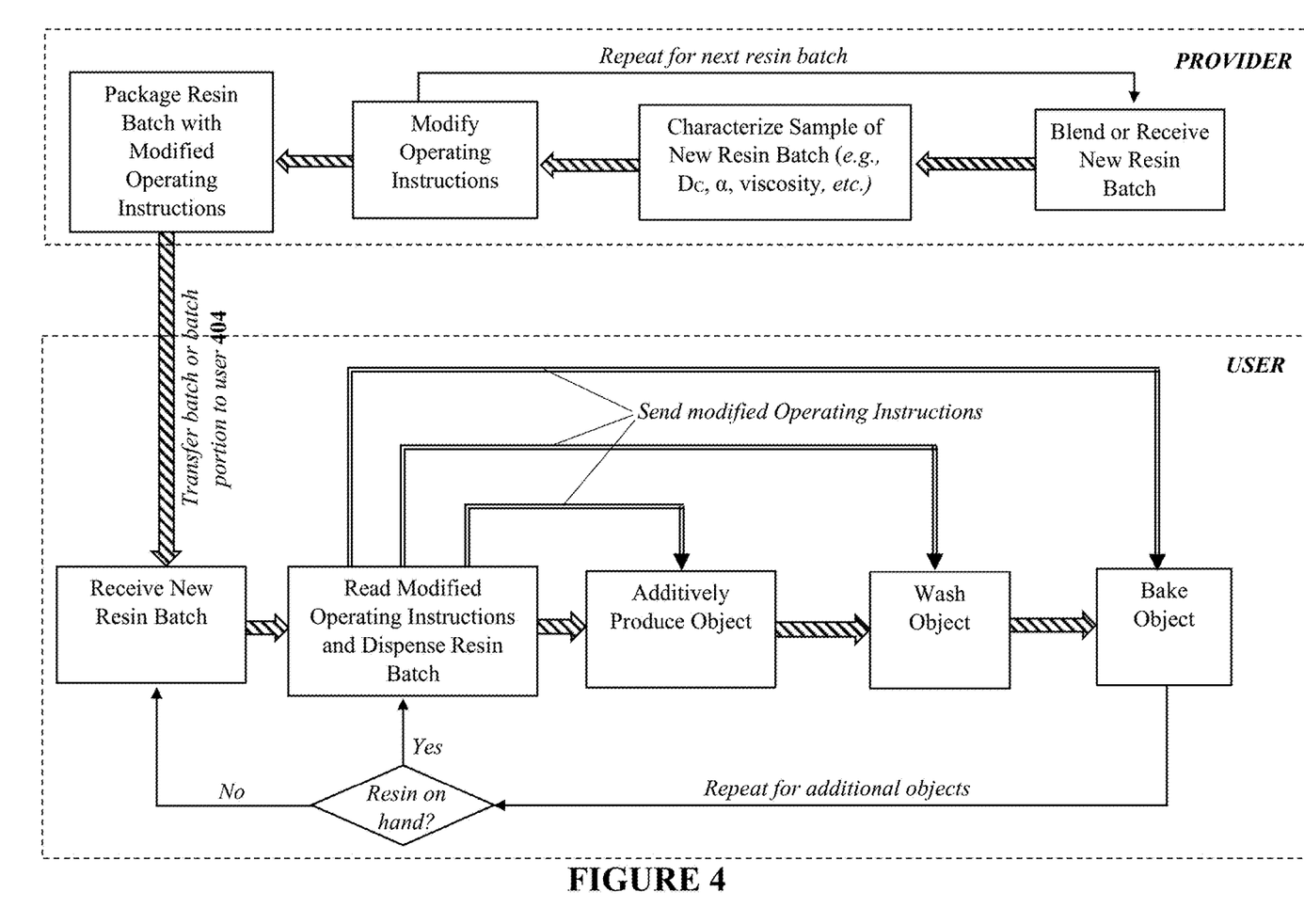
FIG. 4 schematically illustrates a fourth embodiment of the invention, in which additive manufacturing apparatus operating parameters are sent to the apparatus by affixing or otherwise associating those characteristics to the container in which the resin is shipped to the user.
Figure 5:
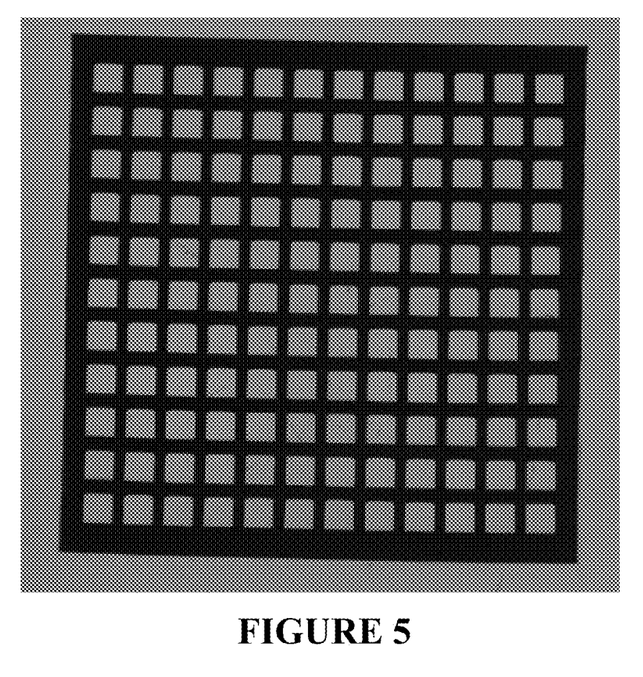
FIG. 5 is a photograph of a test object resting on a light table, which object is useful for measuring cure-through and overcure in a resin batch sample.
Figure 6A:
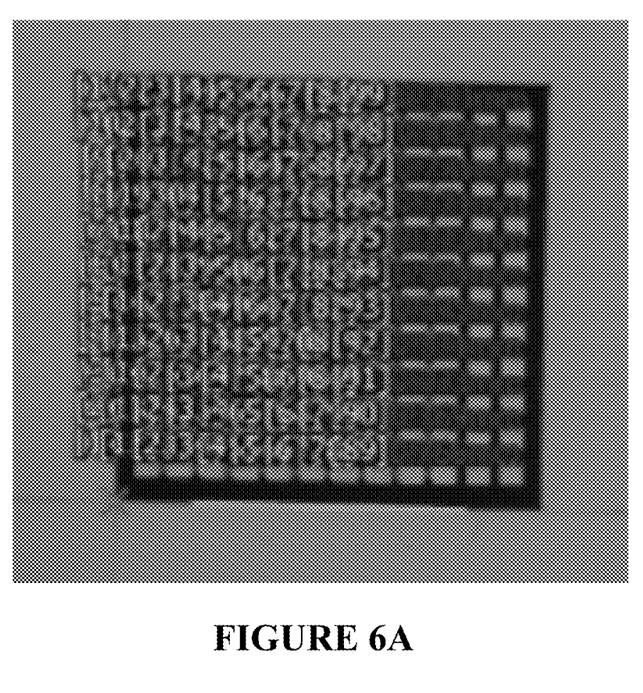
FIG. 6A is a photograph of a test object as in FIG. 5, in the course of measuring dimensions of struts on a light table.
Figure 6B:
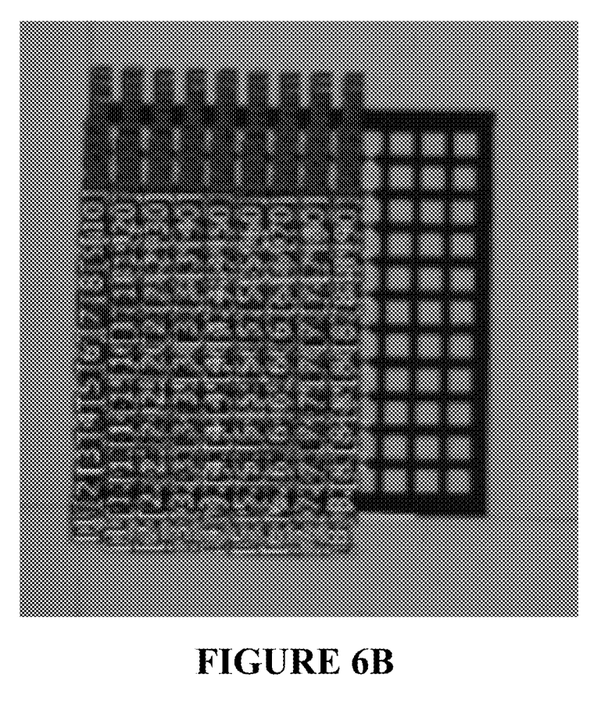
FIGS. 6B and 6C are a second and third photograph, respectively, of a test object as in FIG. 5, in the course of measuring dimensions of struts on a light table.
Figure 6C:
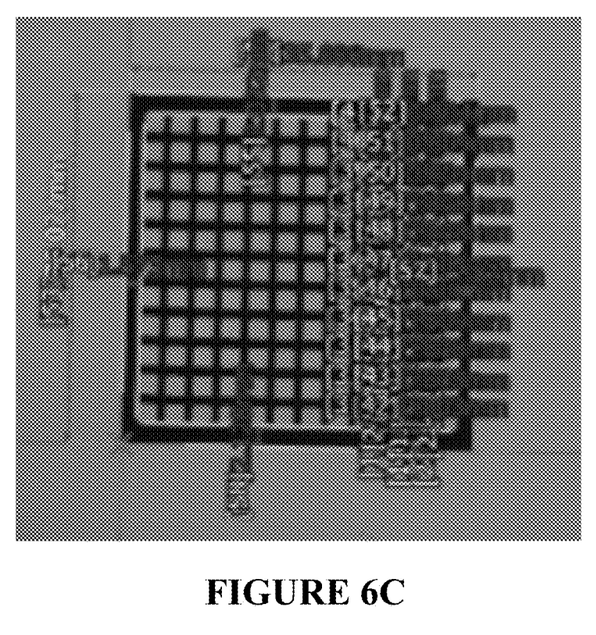

In the embodiments of FIGS. 1-2, process control information is distributed from the provider to the user by means of the internet. In the embodiments of FIGS. 3-4, process control information is distributed from the provider to the user by other means, such as an information storage media associated with a resin container. In the embodiments of FIGS. 1 and 3, the distributed process control information is resin batch characteristics; in the embodiments of FIGS. 2 and 4, the distributed process control information is modified operating instructions.

Object file security. In all of the embodiments, the three dimensional object is produced from an object data file, such as a CAD file or .stl file, which often have proprietary value to the user. Hence the object data files used to produce objects in the present invention are preferably entered and retained by the user, are and not accessible to the provider (at least not without authorization from the user). The object data file can be entered into the additive manufacturing apparatus controller by the user directly or indirectly by any suitable means, such as by coupling an external personal computer containing the data file to the controller. While the controller (which may consist of one or more computers or devices) can be in communication with the provider through the internet or other means, to receive the updated characteristics or operating instructions described herein, or to send certain limited operating information (such as overall production speed, operating temperatures, etc.) back to the provider, the controller is configured (through use of appropriate hardware and/or software configurations) so that the object data file is securely retained by the user.

In the embodiment of FIG. 1, once a new resin batch is blended or received, a new unique identity is assigned thereto (101). A (typically small) sample of that batch is then characterized (102) as described above, and those characteristics saved in a database (103) in association with the resin unique identity. The remainder of the resin is typically packaged (usually in multiple different containers) for shipping to one or more end users 104.

The resin batch containers may have a unique identifier associated therewith that contains the batch unique identity in an automatically readable form, or simply the resin unique identity printed thereon for manual entry by the user (as noted above).

The foregoing steps are repeated by the resin provider(s) for each new batch of resin (105).

Upon receipt of a resin batch (in one or more containers) at the end user (111), the resin may optionally be stored, and then dispensed (or blended with another precursor resin and dispensed, in the case of a dual precursor resin) into an additive manufacturing apparatus (such as by dispensing into a "window cassette" that is placed into the apparatus. The batch identity is then manually or automatically entered into an appropriate interface (e.g., by an entry pad or unique identifier reader on the additive manufacturing apparatus itself, or on a mixer/dispenser associated with the apparatus (112), as noted above. Note also that the resin unique identity may be tracked through one or more additional set of identifiers and readers, such as via an identifier on a window cassette, which is then in turn read by a reader associated with the manufacturing apparatus.

The resin batch unique identity is then transmitted to the database 113, and the resin batch characteristics (e.g., viscosity, photosensitivity, etc.), transmitted back to the additive manufacturing apparatus 114 (and optionally, to the wash apparatus and oven, if present). The resin batch characteristics are then used to modify the additive manufacturing operating instructions on the additive manufacturing apparatus controller (115), and the object produced (118). If optional wash and bake steps (119, 120) are present, then the operating instructions those steps can, optionally, also be modified, at their respective controllers (116, 117). At the user, the production process can be repeated for additional objects (121) until all of that resin batch is used, at which point a new resin batch can be utilized and the performance optimization process repeated.

FIG. 2 schematically illustrates a process similar to that of FIG. 1, except that the operating instructions are modified at the provider side, rather than on the user side.

FIG. 3 schematically illustrates a process similar to that of FIG. 1, except that, rather than utilizing a database where batch characteristics are associated with a batch identity, the batch characteristics are associated directly with the resin container (e.g., placed on an automatically readable information storage media on the resin container; printed on the resin container; mailed or shipped separately from but otherwise associated with the resin container by a unique alphanumeric code; etc.)

FIG. 4 schematically illustrates a process similar to that of FIG. 2, except that, again rather than utilizing a database, the operating instructions (rather than the batch characteristics as in FIG. 3) for the particular resin batch are associated directly with the resin container.

5. Modifications to Operating Instructions.

The controller of the additive manufacturing apparatus contains, as noted above, operating instructions for implementing the production of an object on that apparatus. In general, such operating instructions will specify various process parameters. Particular process parameters will depend on the operating mode of the apparatus (e.g., continuous, stepped, reciprocal or "pumped", etc., including combinations thereof (i.e., a "mixed operating mode"). The process parameters may be fixed or static, or may be dynamically generated on an object-by-object basis depending on factors such as part size, part density, etc.

As noted above, the process parameters implemented during additive manufacturing will be based on, and optimized for, the "expected" physical characteristic(s) of the resin from which the object is to be produced. Such expected characteristics may be determined as described above, and may be updated from time to time (e.g., by pushing instruction updates to the additive manufacturing apparatus controller over the internet).

Different resin "batches" of the same "resin type" can differ from one another in resin characteristics that detrimentally affect production, as also noted above. Accordingly, the process parameters, and the operating instructions which incorporate or generate those process parameters, are preferably modified for each batch. Examples of how the process parameters may be modified include, but are not limited to, the following (and include combinations of the following, particularly when the apparatus is implementing a mixed operating mode). In all of the following, "greater than expected" or "less than expected" refer to the actual measured value of the resin characteristic for that resin batch, as compared to the expected value of the physical characteristic for resins of that "resin type," as described above.

When photosensitivity is greater than expected, the duration and/or intensity of light exposure during additive production can be decreased.

When photosensitivity is less than expected, the duration and/or intensity of light exposure during additive production can be increased.

When part shrinkage (during part production or further curing post-production) for parts produced from a given resin batch is greater than expected, magnification of each projected slice of the part during additive production may be increased (with magnification being carried out optically, in software, or a combination thereof).

When part shrinkage (during part production or further curing post-production) for parts produced from a given resin batch is less than expected, magnification of each projected slice of the part during production may be decreased (with magnification being carried out optically, in software, or a combination thereof).

When part shrinkage for parts produced from a given resin batch is greater than expected, step height during exposure of slices of the part during production may be increased.

When part shrinkage for parts produced from a given resin batch is less than expected, step height during exposure of slices of the part during production may be decreased.

When cure-through is greater than expected, the delay in exposure of underlying regions can be increased.

When cure-through is less than expected, the delay in exposure of underlying regions can be decreased.

When over-cure is less than expected, the amount of inward shift of the object perimeter can be decreased;

When over-cure is greater than expected, the amount of inward shift of the object perimeter can be increased.

When under-cure is less than expected, the amount of outward shift of the object perimeter can be decreased.

When under-cure is greater than expected, the amount of outward shift of the object perimeter can be increased.

(Objects produced from some resins may be brittle if they become too hot during additive manufacturing production (from heat generated during the exothermic photopolymerization reaction)). When objects produced from a particular resin batch will generate more than expected heat during additive production, the speed of production can be decreased, and/or the amount of resin cooling can be increased.

When objects produced from a particular resin batch will generate less than expected heat during additive production, the speed of production can be increased, and/or the amount of resin cooling can be decreased.

When objects produced from some resin batches have weaker tensile properties than expected, the light intensity and/or light exposure duration during production can be increased.

When the viscosity of a resin batch is greater than expected, the height of upstroke, and/or the height of any downstroke, may be increased, and/or the amount of resin heating can be increased (e.g., to reduce the failure rate of the process). When the viscosity of a resin batch is greater than expected, the duration of upstroke, and/or the duration of any downstroke, and/or the duration of any pre-exposure or post-exposure pause, may be increased.

When the viscosity of a resin batch is less than expected, the height of upstroke, and/or the height of any downstroke, may be decreased (e.g., to increase the speed of the process). When the viscosity of a resin batch is less than expected, the duration of upstroke, and/or the duration of any downstroke, and/or the duration of any pre-exposure or post-exposure pause, may be decreased.

The foregoing examples are illustrative and not intended to be limiting. Process parameters that can be altered on a batch-by-batch rotation will depend upon, among other things, the physical capabilities of the particular apparatus.

If the apparatus has resin heating or cooling capability, then resin heating or cooling can be included in the modified parameters via appropriate adjustment an control. If the apparatus has a rotational resin pumping feature, that too can be modified, in speed, frequency, etc., depending on physical characteristics such as resin viscosity.

Similarly, operating instructions and process parameters to wash apparatus and bake apparatus can be modified based on actual resin batch characteristics, in like manner as described above, to further optimize the actual performance of individual resin batches during additive manufacturing. For example, wash cycles can be shortened or extended; wash temperatures can be increased or decreased; bake times can be shortened or extended; maximum bake temperature can be increased or decreased; ramps or pauses in bake cycles can be shortened or extended; etc.

6. Objects for Manufacture.

The present invention can be used with any type of object amenable to additive manufacturing, including rigid, flexible, and elastic objects.

In some embodiments, the invention is suitable where the object(s) made require production at a high level of accuracy, or within close tolerances. Examples of such objects include, but are not limited to: patient-specific forms, guides, aligners, models, or implants (e.g., a dental aligner, a dental model, a dental die, a surgical guide such as for orthopedic surgery, an implantable stent, etc.); connectors, such as electrical connector housings; etc.

The foregoing is illustrative of the present invention, and is not to be construed as limiting thereof. The invention is defined by the following claims, with equivalents of the claims to be included therein.

We claim:

1. A provider-based method of enhancing at least one performance characteristic of a plurality of additive manufacturing apparatuses during production of an object on each apparatus, each apparatus including a light source and a controller containing operating instructions for production of said object on that apparatus, the method comprising:

(a) blending and/or receiving a plurality of different and distinct light polymerizable resin batches;

(b) assigning a unique identity to each resin batch;

(c) determining at least one resin physical characteristic for each resin batch;

(d) modifying, for each resin batch, the operating instructions for the controller of each apparatus based on the at least one physical characteristic of each resin batch to thereby provide modified operating instructions for each resin batch;

(e) storing in a database, in association with each said assigned unique identity, either (i) said at least one resin physical characteristic for each resin batch, or (ii) said modified operating instructions for each resin batch;

(f) receiving at said database an identification of a specific resin batch from which an object is to be produced on a specific additive manufacturing apparatus; and then (g) either:

(i) sending from the database to the controller of said specific additive manufacturing apparatus the modified operating instructions for said specific resin batch, for production of said object on said apparatus with said resin batch, or (ii) sending from said database to said controller of said specific additive manufacturing apparatus the at least one physical characteristic for a specific resin batch, for modification of said operating instructions based on said at least one physical characteristic, and then for production of said object on said apparatus with said resin batch, wherein the at least one resin physical characteristic comprises viscosity, photosensitivity, cure-through, overcure, heat generation during photopolymerization, at least one mechanical property of a test object produced by the resin, or a combination thereof and the modified operating instructions are dynamically generated on an object-by-object basis based on factors including object size and/or object density.

2. The method of claim 1, further comprising:
packaging each resin batch in at least one container, each container having a container unique identifier associated therewith;
associating said resin batch unique identity with said container unique identifier; and wherein
said sending step (g) is carried out upon detection of said unique identifier by a unique identifier reader operatively associated with said specific apparatus and transmission of said unique identity to said database.

3. The method of claim 1, further comprising:
packaging each resin batch in at least one container;
labelling each container with said resin batch unique identity; and wherein
said sending step (g) is carried out upon manual entry by a user of said unique identity and transmission thereof to said database.

4. A user-based method of enhancing at least one performance characteristic of an additive manufacturing apparatus during production of an object, the apparatus including a light source and a controller containing operating instructions for production of the object on that apparatus, the method comprising:
(a) dispensing a batch of a light polymerizable resin into the additive manufacturing apparatus, said batch characterized by at least one physical characteristic;
(b) determining a unique identity of said batch;
(c) sending said unique identity of said batch to a database; then
(d) either:
(i) receiving on said controller from the database modified operating instructions for said resin batch, which modified operating instructions have been modified based on said at least one physical characteristic, or
(ii) receiving on said controller from the database the at least one physical characteristic for said resin batch and modifying said operating instructions based on said at least one physical characteristic; and then
(e) producing said object from said batch of light polymerizable resin on said additive manufacturing apparatus with said modified operating instructions,
wherein said at least one physical characteristic of said batch of light polymerizable resin comprises viscosity, photosensitivity, cure-through, overcure, heat generation during photopolymerization, at least one mechanical property of a test object produced by the resin, or a combination thereof and the modified operating instructions are dynamically generated on an object-by-object basis based on factors including object size and/or object density.

5. The method of claim 4, further comprising, prior to said producing step (e), the step of:
selecting a performance characteristic to be optimized.

6. The method of claim 4, wherein said sending and receiving steps are carried out over the internet.

7. The method of claim 4, wherein said database comprises a cloud database.

8. A provider-based method of enhancing at least one performance characteristic of a plurality of additive manufacturing apparatuses during production of an object on each apparatus, each apparatus including a light source and a controller containing operating instructions for production of said object on that apparatus, the method comprising:
(a) blending and/or receiving a plurality of different and distinct light polymerizable resin batches;
(b) determining at least one resin physical characteristic for each resin batch;
(c) modifying, for each resin batch, the operating instructions for the controller of each apparatus based on the at least one physical characteristic of each resin batch to thereby provide modified operating instructions for each resin batch;
(d) packaging each resin batch in at least one container;
(e) storing in association with each said container either (i) said at least one resin physical characteristic for each resin batch contained therein, or (ii) said modified operating instructions for each resin batch contained therein,
wherein said at least one resin physical characteristic comprises viscosity, photosensitivity, cure-through, overcure, heat generation during photopolymerization, at least one mechanical property of a test object produced by the resin, or a combination thereof and the modified operating instructions are dynamically generated on an object-by-object basis based on factors including object size and/or object density.

9. The method of claim 8, each container having an information storage media associated therewith;
wherein said storing step is carried out by recording said at least one physical characteristic or modified operating instruction on said storage media.

10. The method of claim 8, further comprising:
labelling each container with said at least one physical characteristic of said resin batch contained therein.

11. A user-based method of enhancing at least one performance characteristic of an additive manufacturing apparatus during production of an object, the apparatus including a light source and a controller containing operating instructions for production of the object on that apparatus, the method comprising:
(a) dispensing a batch of a light polymerizable resin from a container into the additive manufacturing apparatus, said batch characterized by at least one physical characteristic, with said container having associated therewith either said at least one physical characteristics, or modified operating instructions modified based on said at least one physical characteristic;
(b) either:
(i) receiving on said controller modified operating instructions associated with said container for said resin batch therein, which modified operating instructions have been modified based on said at least one physical characteristic, or
(ii) receiving on said controller the at least one physical characteristic associated with said container for said specific resin batch therein, and modifying said operating instructions based on said at least one physical characteristic; and then
(c) producing said object from said batch of light polymerizable resin on said additive manufacturing apparatus with said modified operating instructions, wherein said at least one resin physical characteristic comprises viscosity, photosensitivity, cure-through, overcure, heat generation during photopolymerization, at least one mechanical property of a test object produced by the resin, or a combination thereof and the modified operating instructions are dynamically generated on an object-by-object basis based on factors including object size and/or object density.

12. The method of claim 11, further comprising, prior to said producing step (c), the step of:
selecting a performance characteristic to be optimized.

13. The method of claim 11, wherein said object is produced from an object data file entered in to said controller by said user in a secured configuration.

14. The method of claim 11, wherein said additive manufacturing apparatus comprises a bottom-up stereolithography apparatus.

15. The method of claim 11, wherein said at least one performance characteristic comprises speed of production, accuracy of production, reliability of production, product mechanical properties, or a combination thereof.

16. The method of claim 11, wherein said object comprises: a patient-specific form, guide, aligner, model, or implant; or a connector.

17. The method of claim 11, wherein said modified operating instructions comprise at least one modified process parameter selected from:
light intensity;
light exposure duration;
inter-exposure duration;
speed of production;
horizontal (X, Y) magnification;
vertical (Z) magnification;
height and/or duration of upstroke in a stepped or reciprocal operating mode;
height and/or duration of downstroke in a reciprocal operating mode;
speed or frequency of rotation;
resin heating;
resin cooling;
and combinations thereof.

18. The method of claim 11, wherein said modified operating instructions comprise at least one modified process parameter selected from:
(i) when photosensitivity is greater than expected, the duration and/or intensity of light exposure during additive production is decreased;
(ii) when photosensitivity is less than expected, the duration and/or intensity of light exposure during additive production is increased;
(iii) when object shrinkage during object production or further curing post-production for objects produced from a given resin batch is greater than expected, magnification of each projected slice of the object during additive production is increased;
(iv) when object shrinkage during object production or further curing post-production for objects produced from a given resin batch is less than expected, magnification of each projected slice of the object during production is decreased with magnification being carried out optically, in software, or a combination thereof;
(v) when object shrinkage for objects produced from a given resin batch is greater than expected, step height during exposure of slices of the object during production is increased;
(vi) when object shrinkage for objects produced from a given resin batch is less than expected, step height during exposure of slices of the object during production is decreased;
(vii) when cure-through is greater than expected, the delay in exposure of underlying regions is increased;
(viii) when cure-through is less than expected, the delay in exposure of underlying regions is decreased;
(ix) when over-cure is less than expected, the amount of inward shift of the object perimeter is decreased;
(x) when over-cure is greater than expected, the amount of inward shift of the object perimeter is increased;
(xi) when under-cure is less than expected, the amount of outward shift of the object perimeter can be decreased;
(xii) when under-cure is greater than expected, the amount of outward shift of the object perimeter can be increased;
(xii) when objects produced from a particular resin batch will generate more than expected heat during additive production, the speed of production is decreased, and/or the amount of resin cooling is increased;
(xiv) when objects produced from a particular resin batch will generate less than expected heat during additive production, the speed of production is increased, and/or the amount of resin cooling is decreased;
(xv) when objects produced from some resin batches have weaker tensile properties than expected, the light intensity and/or light exposure duration during production is increased;
(xvi) when the viscosity of a resin batch is greater than expected, the height of upstroke, and/or the height of any downstroke, is increased, and/or the amount of resin heating is increased; when the viscosity of a resin batch is greater than expected, the duration of upstroke, and/or the duration of any downstroke, and/or the duration of any pre-exposure or post-exposure pause, is increased;
(xvii) when the viscosity of a resin batch is less than expected, the height of upstroke, and/or the height of any downstroke, is decreased; when the viscosity of a resin batch is less than expected, the duration of upstroke, and/or the duration of any downstroke, and/or the duration of any pre-exposure or post-exposure pause, is decreased;
and combinations thereof.

* * * * *